United States Patent [19]
Sharrow

[11] Patent Number: 5,191,662
[45] Date of Patent: Mar. 9, 1993

[54] FLUSH LIMITING MECHANISM

[76] Inventor: John A. Sharrow, Apt. #307, 4050 W. Lake Sammamish Pkwy. NE., Redmond, Wash. 98052

[21] Appl. No.: 918,595

[22] Filed: Jul. 24, 1992

[51] Int. Cl.⁵ .............................................. E03D 1/14
[52] U.S. Cl. .......................................... 4/325; 4/415
[58] Field of Search ........................... 4/324, 325, 415

[56] References Cited

U.S. PATENT DOCUMENTS

| | | | |
|---|---|---|---|
| 3,538,519 | 11/1970 | Weisz | 4/325 |
| 3,839,746 | 10/1974 | Kowalski | 4/325 |
| 4,017,912 | 4/1977 | Young | 4/324 |
| 4,216,555 | 8/1980 | Detjen | 4/324 |
| 4,240,167 | 12/1980 | Gilliland | 4/324 |
| 4,455,694 | 6/1984 | Dymon | 4/415 X |
| 4,483,024 | 11/1984 | Troeh | 4/324 |
| 4,485,501 | 12/1984 | Kloner | 4/324 |
| 4,536,900 | 8/1985 | Hayes | 4/324 |
| 4,651,359 | 3/1987 | Battle | 4/324 |
| 4,748,699 | 6/1988 | Stevens | 4/324 |
| 4,945,581 | 8/1990 | Harris | 4/325 |
| 5,023,960 | 6/1991 | Ratanagsu | 4/393 |
| 5,075,907 | 12/1991 | Harris | 4/325 |
| 5,081,720 | 1/1992 | Ames et al. | 4/324 |

*Primary Examiner*—Charles E. Phillips

[57] ABSTRACT

A device for installation in the tank of a standard toilet, which saves a significant quantity of water by limiting the duration of the flush each time the toilet is flushed by normal operation of the flush handle, yet it allows the operator to select a full flush by simply holding the handle down for approximately 3 seconds before releasing it. Since approximately 75% of all flushes are to eliminate liquid waste, and such flushes typically require 50% to 70% of the water needed to eliminate solid waste, this device can substantially reduce the water usage in a household or business. For new installations, the device is constructed as part of a modified overflow pipe. A second embodiment, intended for retrofit in existing toilets, is constructed in such a way as to allow it to be quickly and easily clamped over the overflow tube in the toilet tank, bringing the benefit of water conservation with convenience and at relatively low cost. By virtue of the adjustable nature of this flush limiting mechanism, it is compatible with a wide variety of flush values, overflow tubes, and toilet tanks, and its operation can readily be optimized for a particular model of toilet and tank and for the requirements of an individual user.

9 Claims, 4 Drawing Sheets

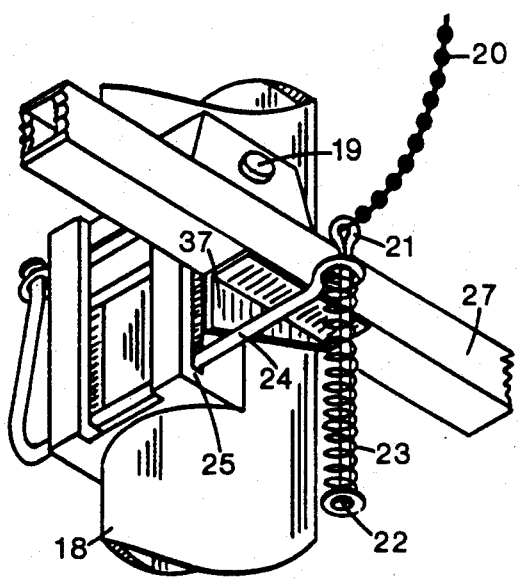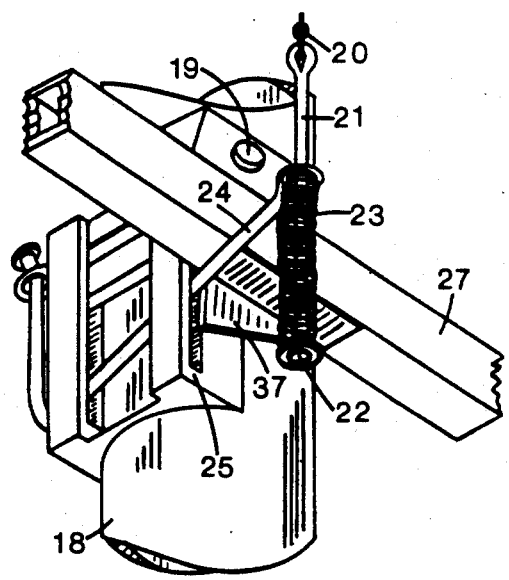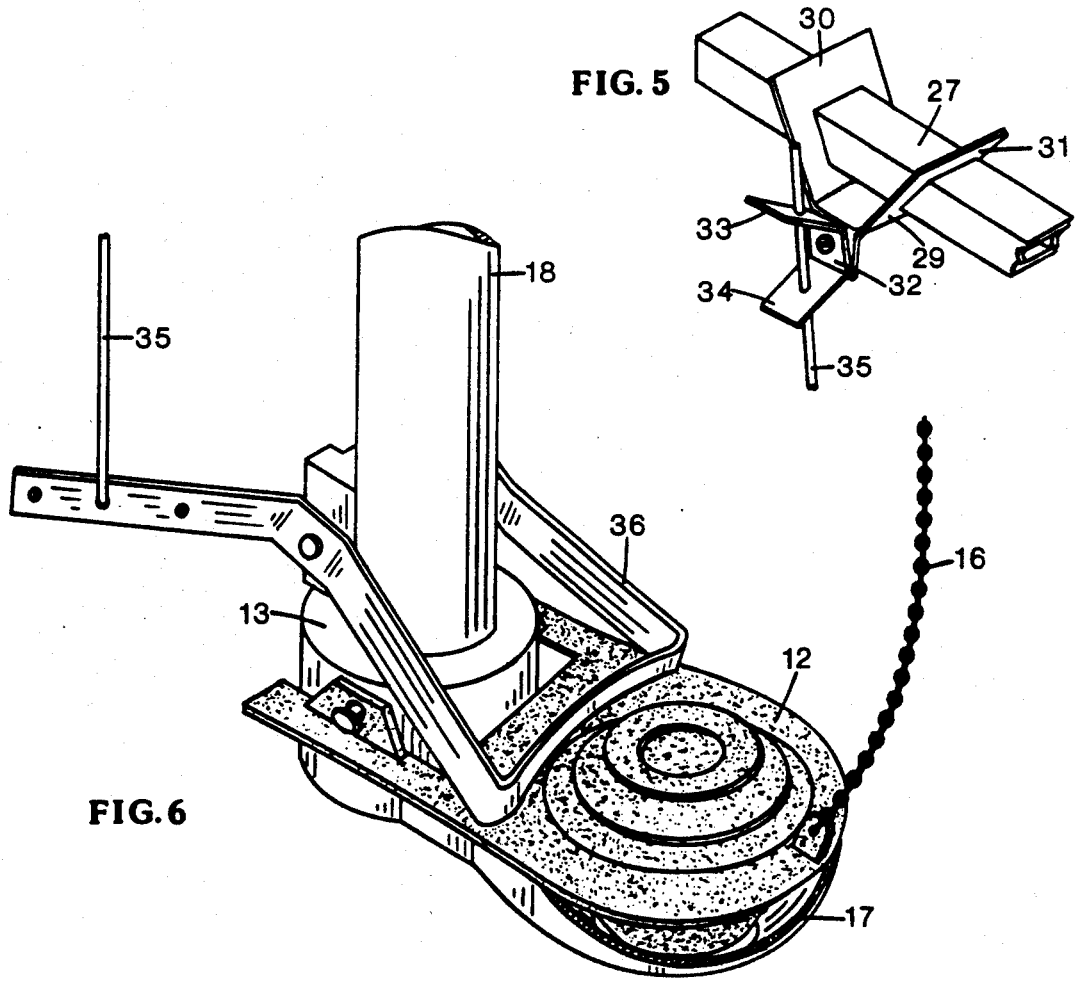

FLUSH LIMITING MECHANISM

BACKGROUND OF THE INVENTION

The present invention generally relates to mechanisms which reduce the amount of water required for the operation of toilets and, more particularly, to dual flush mechanisms for use in conventional toilet tank designs.

The standard toilet is designed to dispose of waste through the use of water, which is held in a tank and released at the proper time by the user. Although such toilets are effective, inexpensive, and in widespread use, they consume excessive amounts of water, since the flush cycle is intended to dispose of solid waste, despite the fact that 60% to 80% of flushes are for liquid waste, which can be removed with a fraction of the water used for a normal flush.

In most parts of the world, water availability is limited, and, with increasing population, its conservation is becoming a critical issue. The quantity of water that can potentially be conserved by using this flush limiting mechanism is of major significance in many areas.

Many attempts have been made to develop devices to reduce the amount of water required to flush a toilet and a number of these have been aimed at giving the user a choice between a limited flush and a full flush. To date, despite a growing need to conserve water, such devices have not found general acceptance. The reasons for this are varied, but in most cases the devices offered have been complex, unreliable, difficult to install, difficult to use, costly, or a combination of these shortcomings.

The present invention overcomes these problems through the use of a simple, reliable mechanism which can be added to a conventional toilet flush mechanism, at a relatively low cost. It gives the user the option of a water-saving limited flush or a full flush by simply changing the amount of time the flush handle is held down when a flush is initiated. It also allows the user to easily set the amount of water used for a limited flush, allowing operation to be optimized for a particular installation.

SUMMARY OF THE INVENTION

The present invention provides the desired dual flush functionality in two embodiments, applicable respectively to new equipment and to toilets that are presently in use. The differences between these forms are primarily in the means of mounting and in the added degree of adjustability incorporated in the version intended for retrofit in existing toilets.

In the first embodiment, the invention comprises a mechanism which allows a preset, limited amount of water to flow through the tank outlet, at which time the flapper valve is forced to close, terminating the flush cycle. A latch is provided which, at the discretion of the user, prevents the action of the aforementioned mechanism, causing a full flush cycle to proceed. This latch is actuated by the same standard external operating lever which lifts the flapper valve to initiate a flush. By holding the flush handle down until the flush limiting mechanism's float is no longer immersed, typically less than 3 seconds, the user elects to allow a full flush to proceed. Each time the toilet tank fills following a flush, the flush limiting mechanism's float is raised by the water level in the tank and the latch is reset, in preparation for another cycle. The flush limiting mechanism includes a weighted float, attached to a float arm, which is pivoted near its mid point. An adjustable coupler is installed at the end of the float arm opposite the float. This coupler is connected by an actuator rod to the flapper valve depressor. When the float descends in the response to the falling water level during a flush, it causes the float arm to change position accordingly. The downward motion of the float results in upward motion of the coupler, which, in turn, through the actuator rod and the extended arm of the pivoted flapper valve depressor, causes downward motion of the flapper valve depressor, bringing it into contact with the outlet flapper valve of the toilet tank.

When the float reaches a level which causes the flapper valve depressor to move the flapper valve to an angle where its buoyancy is overcome and it can no longer remain open, the flush cycle is terminated. Both the starting position of the flapper valve depressor and the rate of movement of the flapper valve depressor relative to the change in float position adjustable, allowing the flush duration of the limited flush cycle to be optimized for various toilet models and to meet user requirements.

If the aforementioned latch has been engaged, the float arm is held in a locked position by a latch lever, which is held wedged in the latch lever guide by the latch strike plate, due to the weight of the float, preventing the float arm and flapper valve depressor from moving and thus allowing a full flush to proceed.

When the tank refills at the end of the flush cycle, the float is raised to its uppermost position where it contacts the float arm stop. At this position, the pressure is released from the latch strike plate, allowing the latch lever to drop to the bottom of the latch lever guide, below the bottom of the latch strike plate, thus resetting the latch in preparation for the next flush cycle.

BRIEF DESCRIPTION OF THE DRAWINGS

FIG. 3 illustrates the float arm latch mechanism in the reset position.

FIG. 4 shows the float arm latch mechanism being set in the latched position.

FIG. 5 illustrates the coupler which connects the float arm to the actuator rod, providing an adjustable attachment to each.

FIG. 6 illustrates the operation of the flapper valve depressor, near the completion of a limited flush.

FIG. 11 also shows a range of positions for the pivoted float.

DESCRIPTION OF THE PREFERRED EMBODIMENTS

Figure 1:
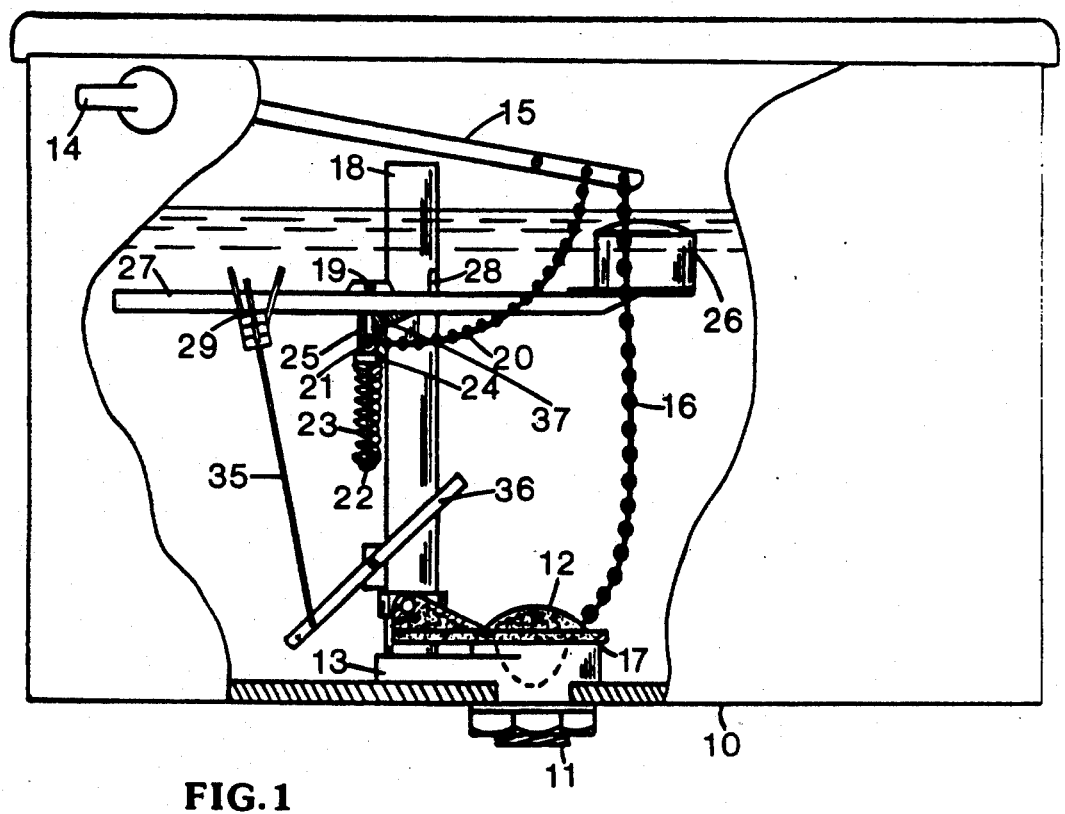
FIG. 1 is a front view of a toilet tank, partially cut away, with the first embodiment of the flush limiting mechanism installed therein.
Figure 2:
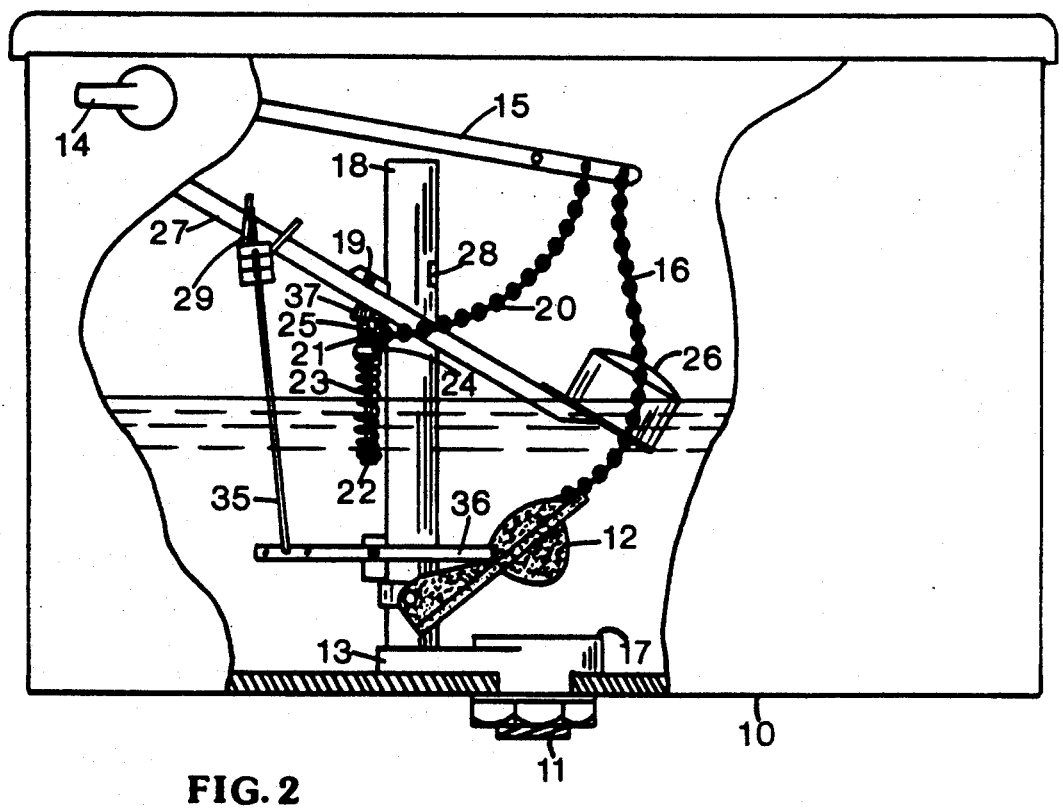
FIG. 2 is a cutaway front view of a toilet tank, with the first embodiment of the flush limiting mechanism installed and a limited flush cycle in progress.
Figure 7:
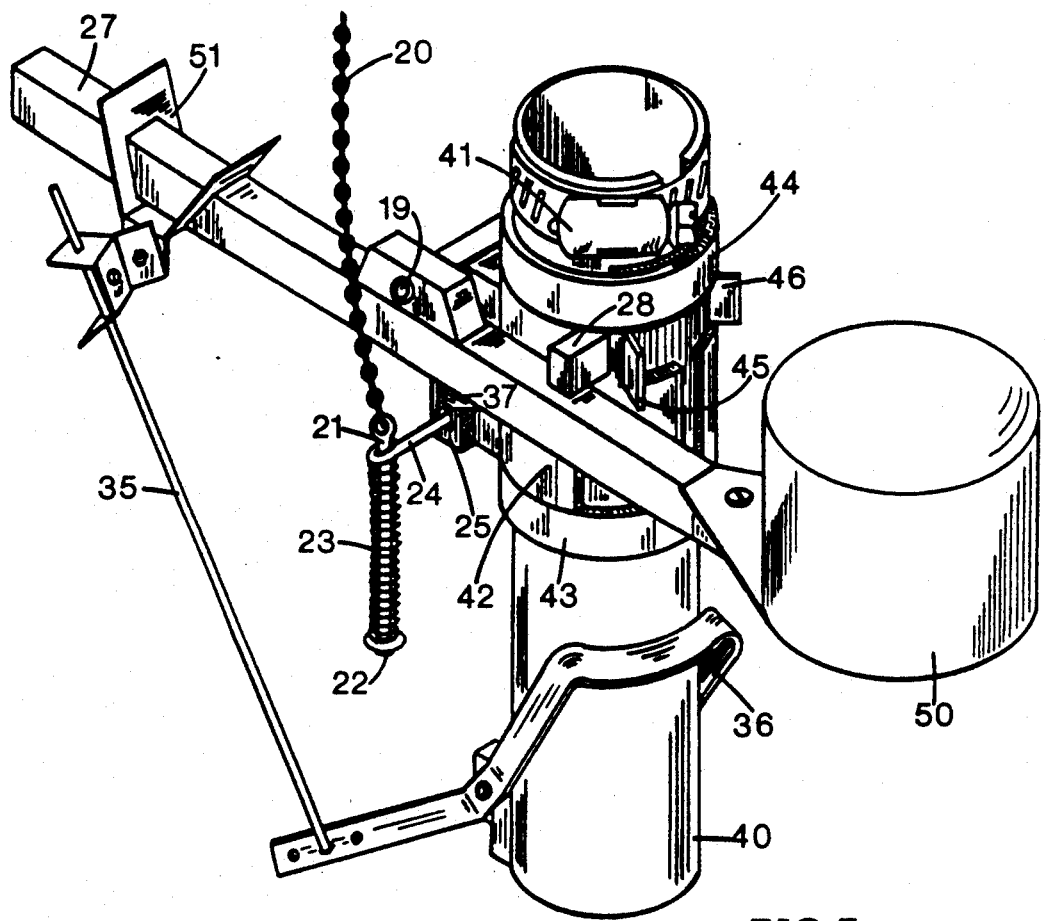
FIG. 7 illustrates the second embodiment of the flush limiting mechanism, intended for easy installation in toilets that are presently in use.

Referring to the first embodiment of the present invention as illustrated in FIGS. 1 and 2, a conventional toilet tank 10 is mounted on the back of and above a toilet bowl. The outlet port 11 is normally covered by a standard float type flapper valve 12 which is pivotally mounted to the base of overflow pipe means 13 which includes an overflow tube 18 which extends above the normal water level in the tank. Pressing downward on flush handle 14 operates the flapper valve 12 by raising flush lever 15, which in turn pulls up on chain 16 lifting flapper valve 12 from its seat 17. Flapper valve 12 stays open as a result of its buoyancy, thus initiating a flush cycle.

Referring particularly to FIG. 3, when flush lever 15 is raised, it also pulls up on chain 20, which is attached to pin 21, which raises spring retainer 22, causing spring 23 to lift latch lever 24. If the flush handle 14 is released as soon as the flush cycle begins, flush lever 15 returns to its resting position, chain 20 goes slack, and latch lever 24 returns to the bottom of latch lever guide 25, providing clearance for latch strike plate 37 to pass. Latch strike plate 37 is made with a tapered profile, causing it to have a clearing effect on latch lever guide 25 as float 26 raises float arm 27 when tank 10 is refilled following a flush cycle. This action ensures that latch lever 24 will not, under any circumstances, obstruct the travel of latch strike plate 37 and float arm 27 when tank 10 refills.

As the water level decreases below that which causes float 26 to hold float arm 27 against stop 28, float 26 follows the decent of the water level, causing float arm 27 to pivot on pin 19, raising coupler 29, which pulls upward on actuator rod 35, causing flapper valve depressor 36 to move toward flapper valve seat 17. When flapper valve depressor 36 contacts flapper valve 12 as shown in FIG. 2, it exerts force which overcomes the buoyancy of flapper valve 12, causing flapper valve 12 to return to its normal position on seat 17, thus ending the flush cycle at a water level determined by the position of coupler 29 on float arm 27 and the effective length of actuator rod 35.

If the operator, desiring a full flush cycle, holds flush handle 14 depressed until the water level is below the level at which float 26 is buoyant, typically less than 3 seconds, before releasing flush handle 14, flush lever 15 pulls up on chain 16, raising flapper valve 12 from seat 17, beginning the flush cycle. As illustrated in FIG. 4, flush lever 15 also pulls up on chain 20, causing pin 21 to lift spring retainer 22, causing spring 23 to lift latch lever 24 to the upper part of the slot in latch lever guide 25. As the water level descends, float 26 loses buoyancy, causing float arm 27 to tilt, bringing latch strike plate 37 into contact with latch lever 24, holding latch lever 24 wedged against the side of the slot in latch lever guide 25, preventing further descent of float 26, and restricting the action of float arm 27 and flapper valve depressor 36, allowing a full flush cycle to proceed.

When a sufficient amount of water has passed from the tank 10 through outlet port 11 to lower the water level in tank 10 below the buoyancy point of flapper valve 12, flapper valve 12 follows the water level downward until flapper valve 12 is no longer buoyant, causing flapper valve 12 to drop to seat 17 and close off outlet port 11, the same as in an unmodified toilet.

Following the flush cycle, tank 10 is refilled with water. As the water level increases, float 26 rises, bringing float arm 27 upward until it contacts stop 28. At this point, latch strike plate 37 is retracted and latch lever 24 drops to the bottom of the slot in latch lever guide 25, resetting the latch in preparation for the next flush cycle.

Figure 10:
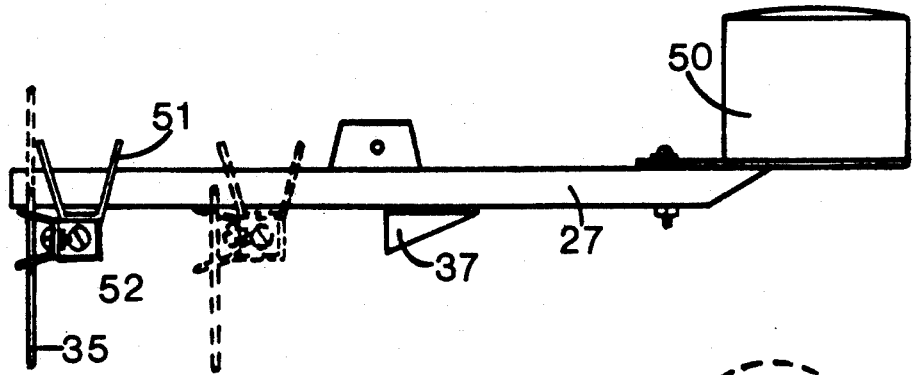
FIG. 10 shows the adjustment ability of the float arm coupler and the pivoted mounting of the float in the second embodiment.

Referring to FIG. 5, coupler 29 may be repositioned on float arm 27 by squeezing tabs 30 and 31 together, thus releasing its spring tension grip on float arm 27, moving coupler 29 to the desired position, then releasing the tabs. In the same fashion, the effective length of actuator rod 30 may be adjusted by squeezing tabs 33 and 34 of the rod clamp section 32, which is pivotally attached to coupler 29, moving actuator rod 35 to the desired position, then releasing the tabs. Moving coupler 29 toward float 26 reduces the rate of movement of flapper valve depressor 36 relative to the change in position of float 26, causing more water to be used for a limited flush. Moving coupler 29 away from float 26 increases the rate of movement of flapper valve depressor 31 relative to the change in position of float 26, reducing the amount of water used for a limited flush. Coupler 29 and rod clamp 32 are each made of thin, springy material, with clearance holes, respectively, for float arm 27 and actuator rod 35. Coupler 29 and rod clamp 32 are shaped in such a manner that they must be deformed moderately in order for float arm 27 and actuator rod 35 to pass through their respective clearance holes. Releasing the deforming pressure allows the inherent spring effect of the material to cause edges of the holes to grip the items passing through providing a clamping action which is easily released and is automatically restored, facilitating such adjustments as may be required. Referring particularly to FIG. 10, these adjustable features are illustrated using coupler 51, the two axis equivalent to coupler 29.

Referring to FIG. 6, flapper valve depressor 36 is pivotally mounted above and behind the pivot point of flapper valve 12 and is shaped in such a way as to permit flapper valve depressor 31 to exert pressure across a broad area of flapper valve 12, ensuring that flapper valve 12 is pressed downward toward seat 17 and that flapper valve 12 is not allowed to tilt, which could otherwise result in malfunction. The curved face of flapper valve depressor 31 serves to provide additional clearance for flapper valve 12 while a full flush is in progress and also allows the use of flapper valves of various designs and styles. The shape and position of flapper valve depressor 36 also allows manual override of the limited flush cycle, if desired, by holding flush handle 14 down until the toilet tank empties.

The second embodiment of the present invention functions in exactly the same manner as the first embodiment (FIGS. 1 through 6), which has been described in preceding paragraphs. It has been enhanced, however, with additional features to facilitate installation in presently installed toilets. These features are designed to accommodate the existence of, and variations in, other devices and mechanisms installed in the toilet tank, which would otherwise impede or prevent proper operation of the flush limiting mechanism.

Referring particularly to FIGS. 7 through 12, the second embodiment of the present invention is constructed on a tubular body 40, with an upper section which has a gap 48, is slit through approximately half its diameter, and is fitted with a clamping means 41, which is capable of reducing the span of gap 48, effectively reducing the inside diameter of the upper section of the tubular body 40, thus retaining said tubular body in the desired position and alignment when installed over the existing overflow tube in the tank of a presently installed toilet. A flush limiting mechanism, similar to that of the previously described first embodiment of the present invention, is mounted on tubular body 40, allowing said flush limiting mechanism to be quickly and easily installed in an existing toilet, bringing the benefit of significant water savings in return for a small investment of time and money.

Figure 8:
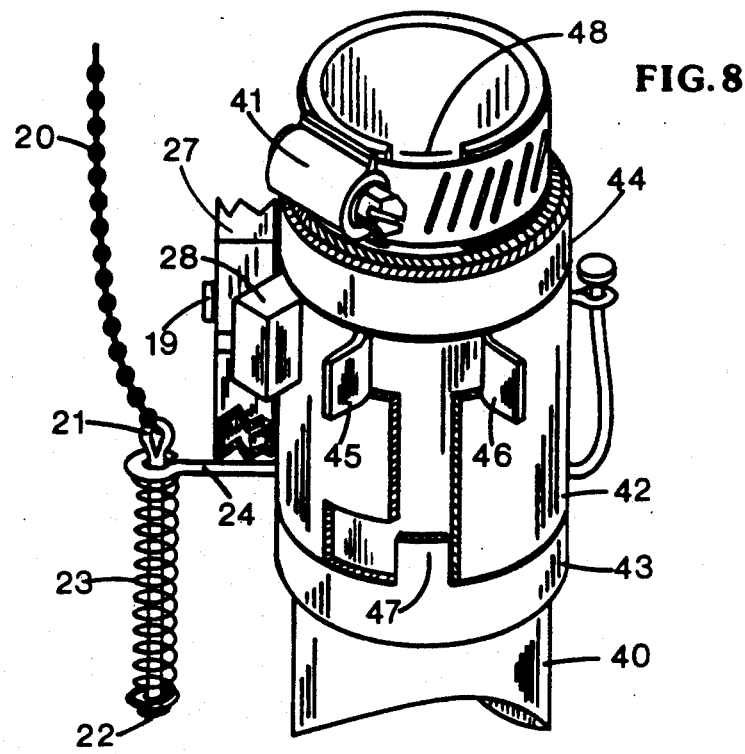
FIG. 8 illustrates the float arm collar that allows adjustment of the axial alignment of the float arm, float, latch, and associated components, relative to the position of the flapper valve depressor.

During the process of assembling a toilet, an installer may position the overflow pipe, and therefore the flapper valve, within a range of 30 degrees (or more) of rotation. In order to allow flapper valve depressor 31 to be positioned correctly and to provide clearance for float arm 27 and float 50 to move freely, float arm 27, stop 28, latch lever 24, latch lever guide 25, and associated components are mounted on a movable collar 42, which is retained in vertical alignment on body 40 by retainers 43 and 44. Collar 42 is expanded and installed over body 40, fitting tightly enough to prevent rotation during normal operation. Tab 45, when pressed in a counterclockwise direction (as viewed from above), and tab 46, when pressed in a clockwise direction, cause collar 42 to expand slightly, allowing collar 42 to be rotated to the desired position, limited only by stop 47. Thus float arm 27, latch 24, and the aforementioned associated components, can be axially repositioned with respect to flapper valve depressor 36, as illustrated in FIG. 8., allowing flapper valve depressor 36 to be optimally positioned with respect to flapper valve 12, while providing clearance for float arm 27 and float 50 to operate properly.

Figure 9:
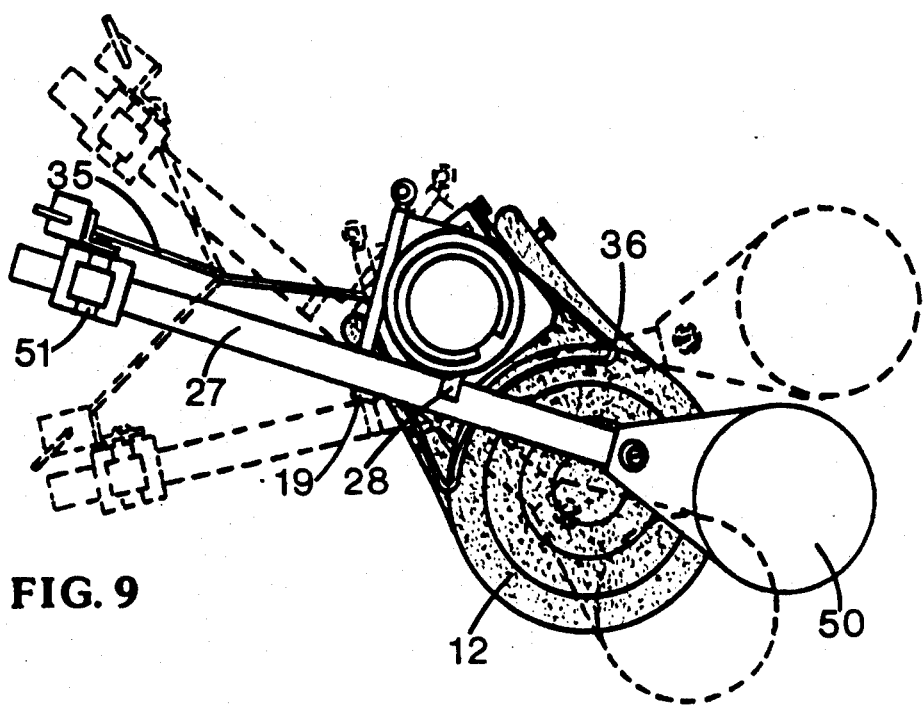
FIG. 9 shows the range of adjustment permitted by the float arm collar.
Figure 11:
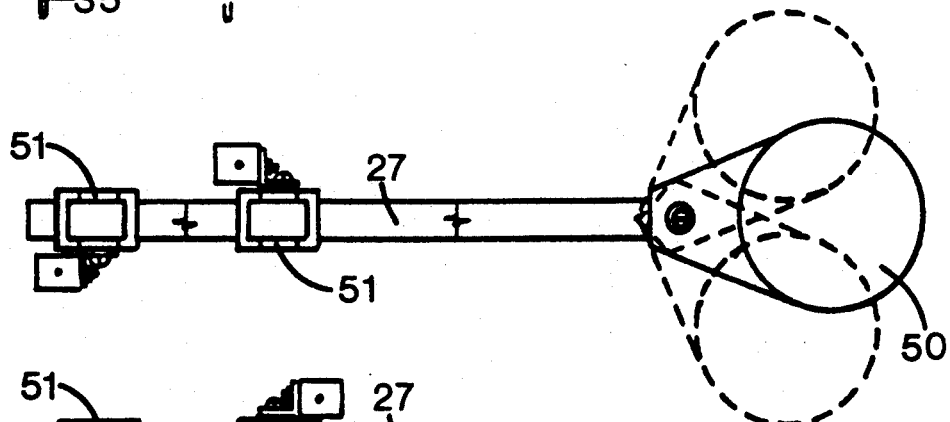
FIGS. 11 and 12 illustrate the four possible orientations of the two axis float arm coupler.
Figure 12:
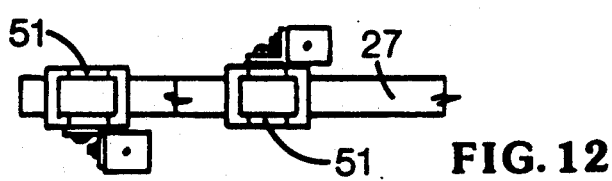

Float 50, as shown in FIGS. 9 through 11, the functional equivalent of float 26 in the first embodiment, is pivotally mounted, allowing it to be positioned as required to prevent the toilet tank, refill valve float, and other devices from interfering with the normal operation of float 50. This feature allows collar 42 to be positioned optimally for the operation of float arm 27 without compromise for the location of float 50.

Referring to FIGS. 9 through 12, coupler 51, the functional equivalent of coupler 29 in the first embodiment, is pivoted in two axes, allowing actuator rod 35 to operate, without binding, over the full rotational range of collar 42. Additionally, this allows coupler 51 to be installed in any of four orientations, providing an additional measure of freedom from interference with the toilet tank and mechanisms installed therein, and also increasing the effective adjustment range of coupler 51.

I claim:

1. A flush limiting mechanism for toilets having a tank with an outlet, an overflow pipe, a float type flapper valve pivotally mounted on said overflow pipe and having a portion thereof, positioned over said outlet, said flapper valve being controlled by a flush handle located externally of said tank which handle in turn controls the position of an internal flush lever which in turn is connected to said flapper valve, said flapper valve preventing the flow of water through the outlet until lifted by the action of said flush handle, at which time said flapper valve holds itself open, through the buoyant action of an integral float chamber, until the tank empties, the present invention allowing the user to select, at the time of initiating a flush, either a full duration flush or a water-saving limited duration flush, dictated by the length of time that said handle is depressed, which present invention is comprised of:

a float arm, pivotally mounted near its mid point to said stand pipe to one end of which float arm is attached a weighted float, which float arm pivots about said mount in response to the rise and fall of water present in the toilet tank, as a result of the action of said weighted float;

a flapper valve depressor, which is pivoted on said stand pipe and so positioned and aligned as to contact said flapper valve to effectively cause reseating and closure of the toilet tank outlet valve; a float arm coupler adjustably attached to an end of the pivotally mounted float arm opposite said one end, an actuator rod pivotally attached at one end to said arm coupler and at another end to the flapper valve depressor in such a manner that the position of said float determines the respective position of said flapper valve depressor, the settings of which adjustable float arm coupler determine the initial position of said flapper valve depressor and also the rate of movement of said flapper valve depressor relative to the rate of movement of said float, said adjustable float arm coupler adjustably clamps to said pivotally mounted float arm at the end opposite said float and adjustably clamps to the actuator rod.

2. The combination recited in claim, 1 with the addition of a lever-type latch, said latch consisting of a captive lever mounted in such a manner that said lever may be selectively positioned to allow or prevent the movement of an associated latch strike plate, which lever-type latch is operated by the action of the existing flush lever, through an actuating chain, the action of which lever-type latch causes the motion of the float arm to be restrained, thus preventing operation of the flapper valve depressor when the user determines that a full duration flush is required.

3. The combination recited in claim 2, in which the latch strike plate has a tapered profile, which plate allows the latch lever to be positioned at the bottom of a slot in the latch lever guide, as the tank refills with water in preparation for the next flush cycle.

4. The combination recited in claim 3, in which the latch lever is linked to the flush lever through an actuating chain and a spring-loaded pin, said spring-loaded pin providing for a substantial amount of overtravel when said flush lever lifts said latch lever, thus ensuring reliable operation of the flush limiting mechanism latch and rendering adjustment of the length of said actuating chain relatively uncritical.

5. The combination recited in claim 4, in which the flapper valve depressor is formed and mounted in such a manner as to, contact, the flapper valve over a broad span, serving to direct said flapper valve down to the valve seat without allowing said flapper valve to twist, which could prevent proper closure of said flapper valve, with said flapper valve depressor shaped and positioned to make said contact with said flapper valve near a top center of said flapper valve when said flapper valve is in the fully opened position, and to make said contact with said flapper valve directly above the valve seat, adjacent to the overflow pipe said depressor spanning an arc of approximately 120 degrees, when said flapper valve approaches the fully closed position, making said flapper valve depressor capable of efficiently and reliably closing said flapper valve in response to the motion of the float, yet allowing the flush limiting action to be manually overridden, if desired, by allowing said flapper valve to be held partially open by the action of the flush lever means, said depressor having an arcuate shape having the added benefit of providing clearance for protrusions which are present in the center of certain models of flapper-type valves.

6. The combination recited in claim 5, wherein said float arm is mounted on a tubular body, which tubular body may be installed directly over the overflow pipe means which exists in the tank of a presently installed standard toilet, and which tubular body is affixed in correct operating position and alignment by a clamping means fitted to the upper end of said tubular body, allowing installation of the flush limiting mechanism in said presently installed standard toilet without the necessity for disassembly or modification of the toilet tank, or mechanisms contained therein.

7. The combination recited in claim 6, wherein the float arm, float arm pivot, float arm stop, latch lever guide, latch lever are mounted on a movable collar, which collar is installed over said tubular body and held in proper vertical and axial alignment by retainer means and which collar may be axially rotated over a limited range, allowing said float arm, float arm pivot, float arm stop, latch lever guide, and latch lever, to be adjusted to alternate axial positions with respect to the flapper valve depressor, ensuring reliable operation of the flush limiting mechanism, despite the presence of objects and mechanisms in the toilet tank which would otherwise obstruct and prevent proper functioning of said float arm and other components of said flush limiting mechanism.

8. The combination recited in claim 7, in which the adjustable float arm coupler is pivoted in two axes, permitting the float arm and associated components to be positioned over a wide range, relative to the position of the flapper valve depressor, without causing misalignment or binding of the actuator linkage for said flapper valve depressor, and which coupler also provides for four possible installation positions, with said actuator linkage routed to the inside or outside of said float arm and with said actuator linkage leading or trailing the position of the coupler, effectively increasing the range of adjustment and providing best clearance for other mechanisms present in the toilet tank.

9. The combination recited in claim 8, in which the float is attached to the float arm by means of a pivoted mounting, which allows said float to be adjusted over a range of horizontal positions with respect to said float arm, providing additional clearance for the fill valve float and other mechanisms in the toilet tank.

* * * * *